May 7, 1957 C. E. SCHOU 2,791,771
FLUID OPERATED YIELDABLE SHIFTER FOR POSITIVE CLUTCHES
Filed Feb. 26, 1954 7 Sheets-Sheet 6
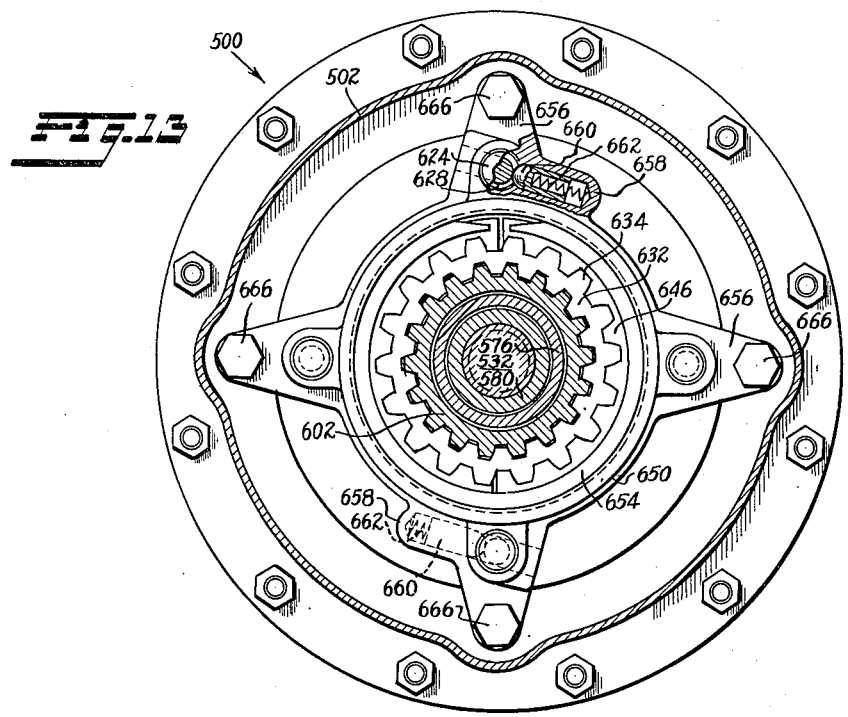
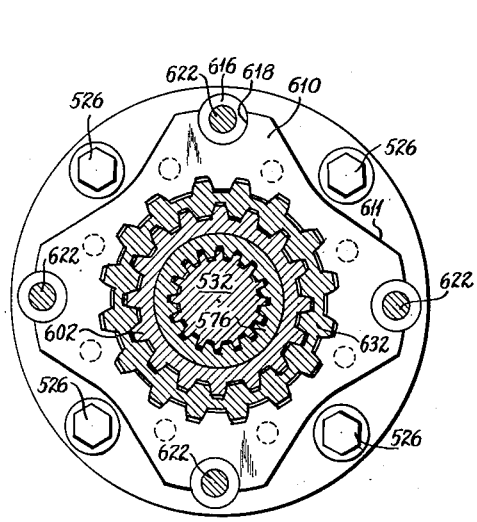
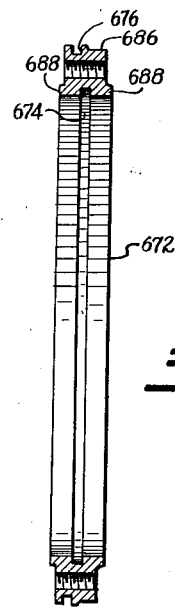
INVENTOR
CARL E. SCHOU
BY Strauch, Nolan & Diggins
ATTORNEYS May 7, 1957  C. E. SCHOU  2,791,771
FLUID OPERATED YIELDABLE SHIFTER FOR POSITIVE CLUTCHES
Filed Feb. 26, 1954  7 Sheets-Sheet 7

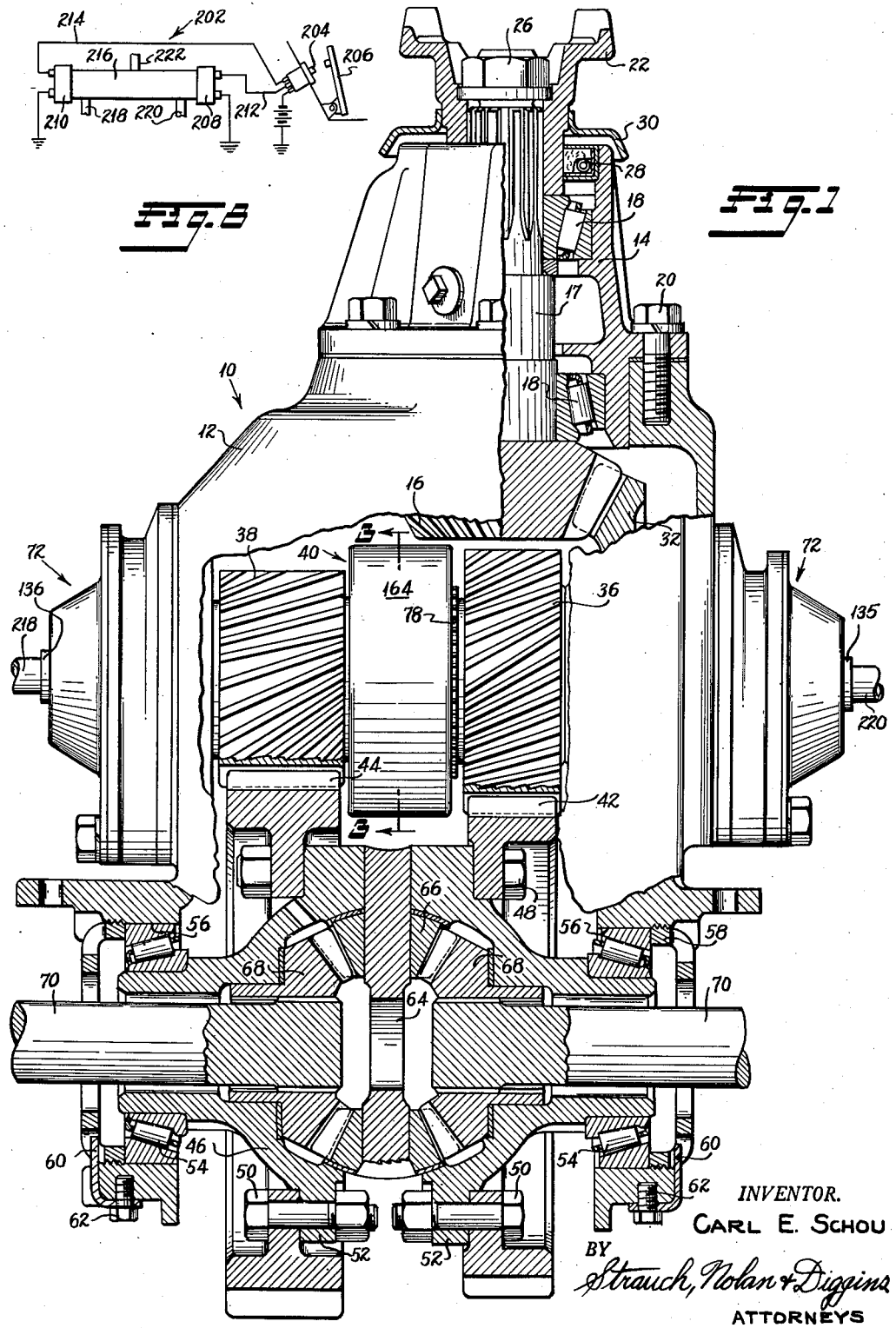

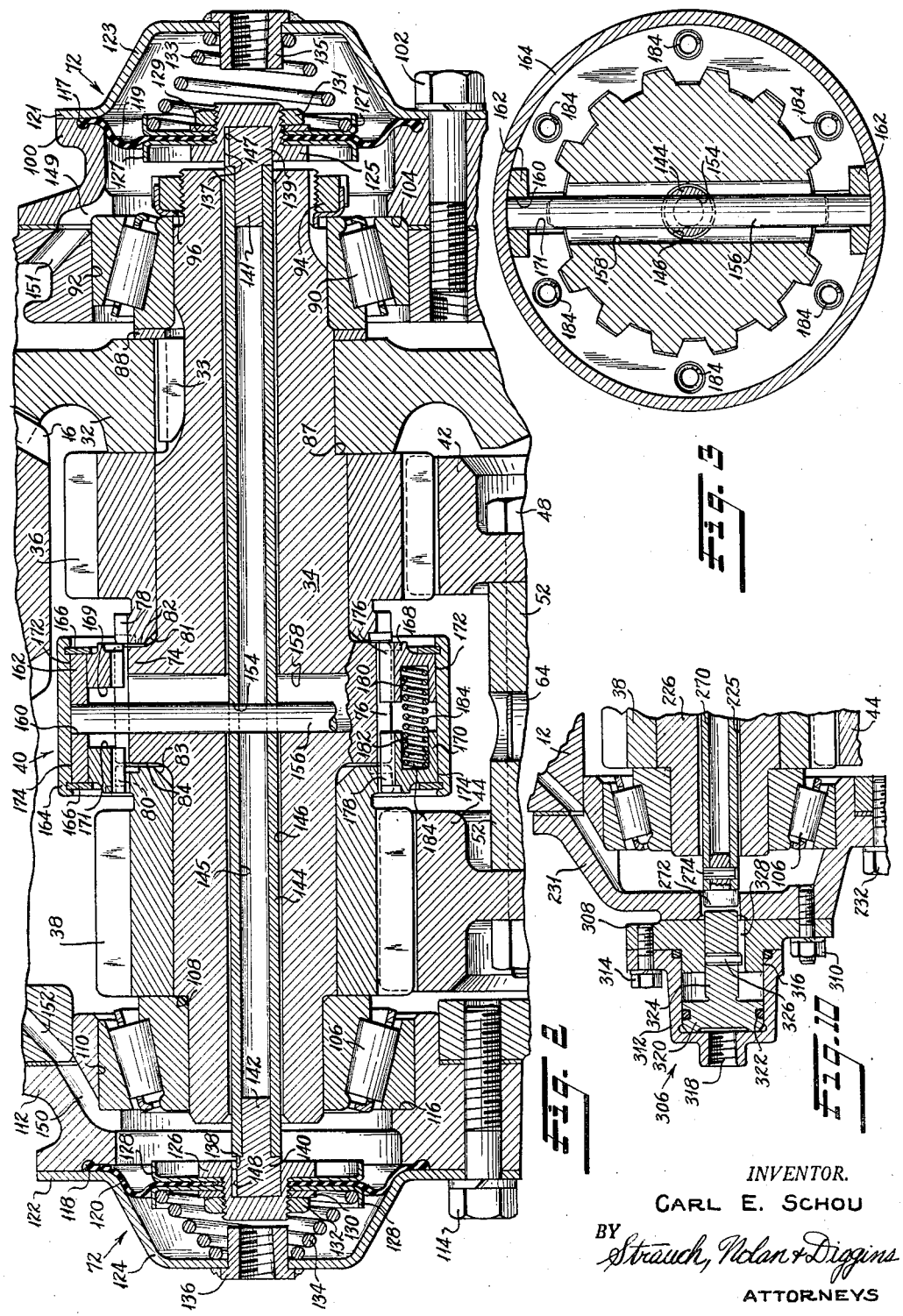

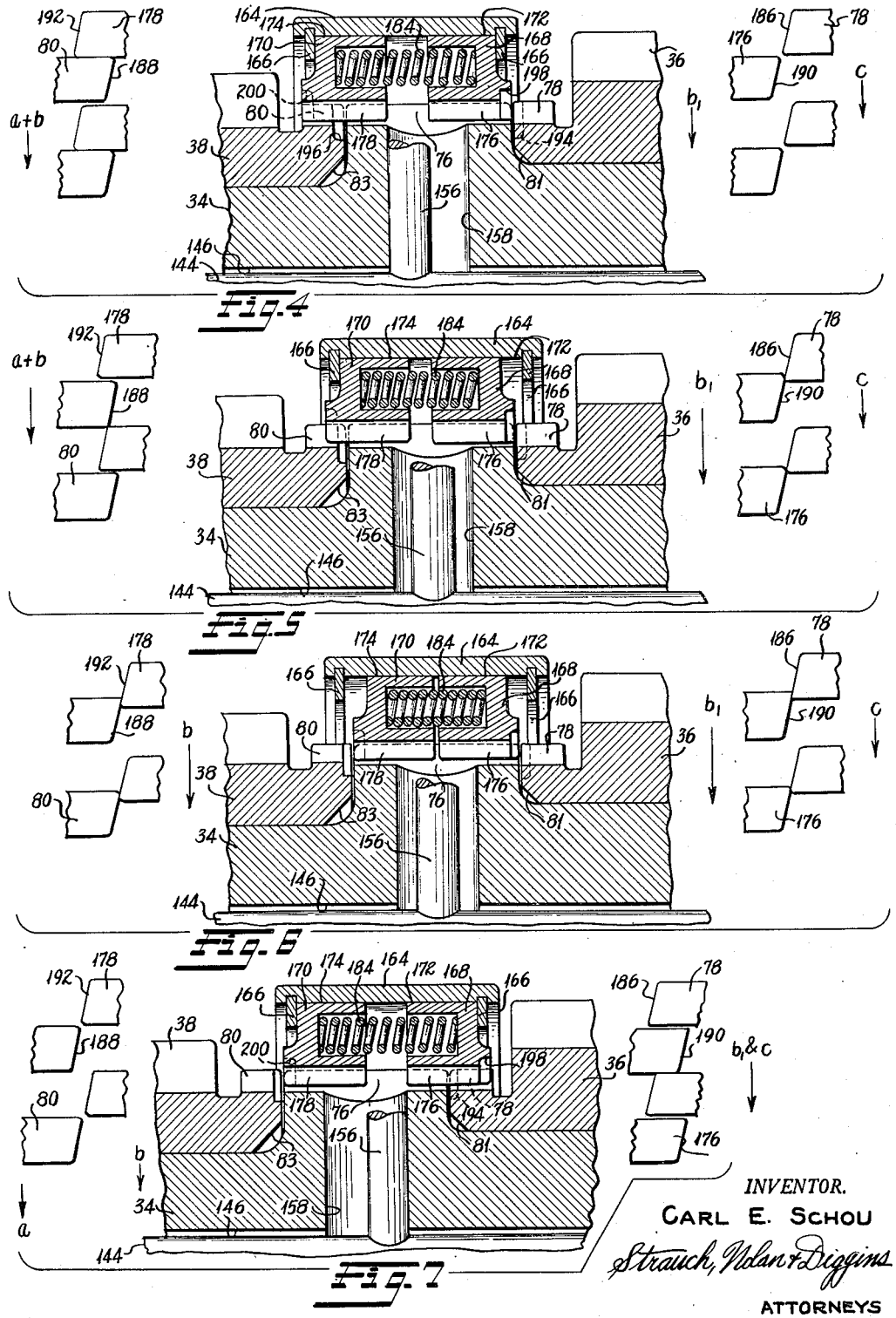

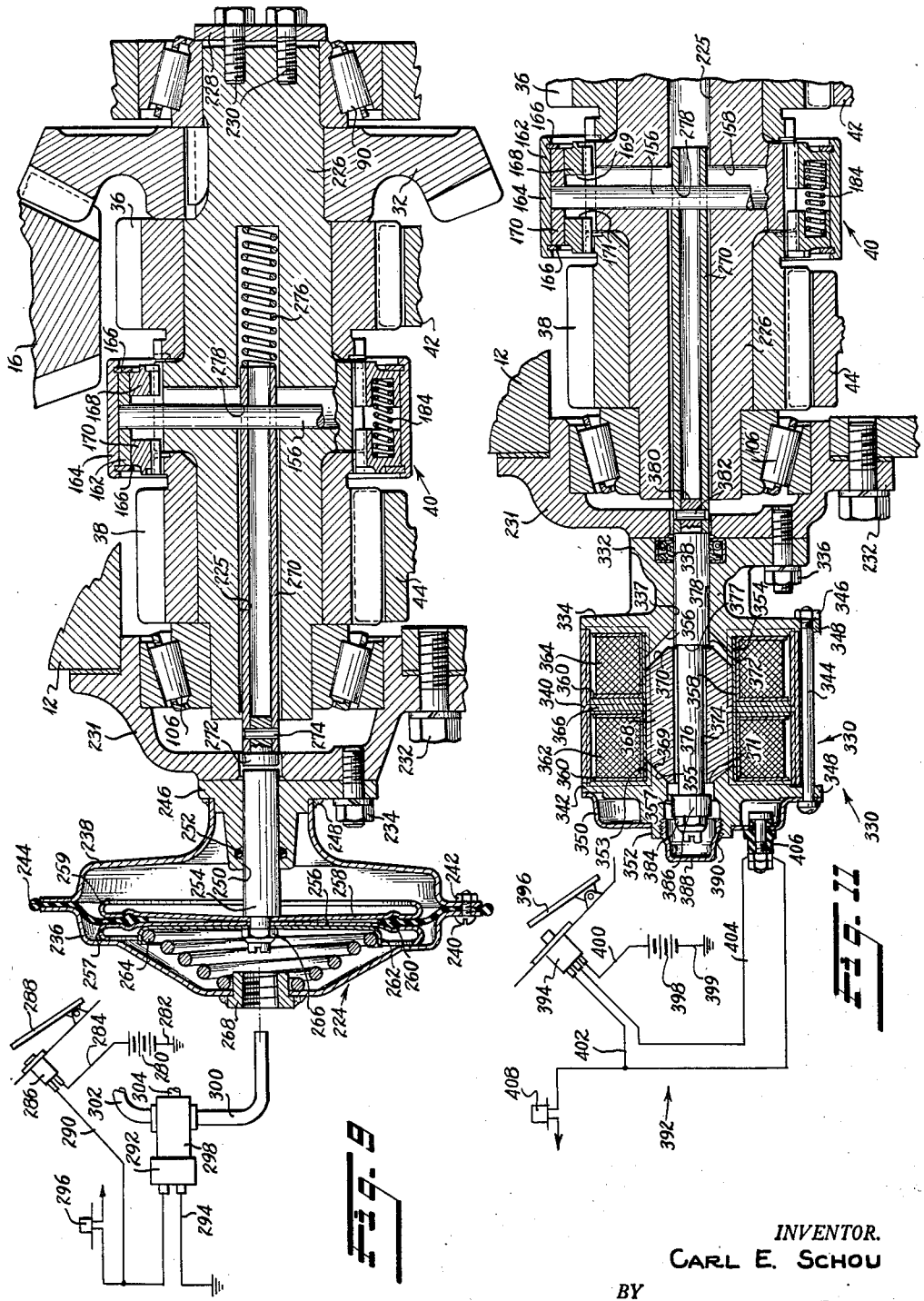

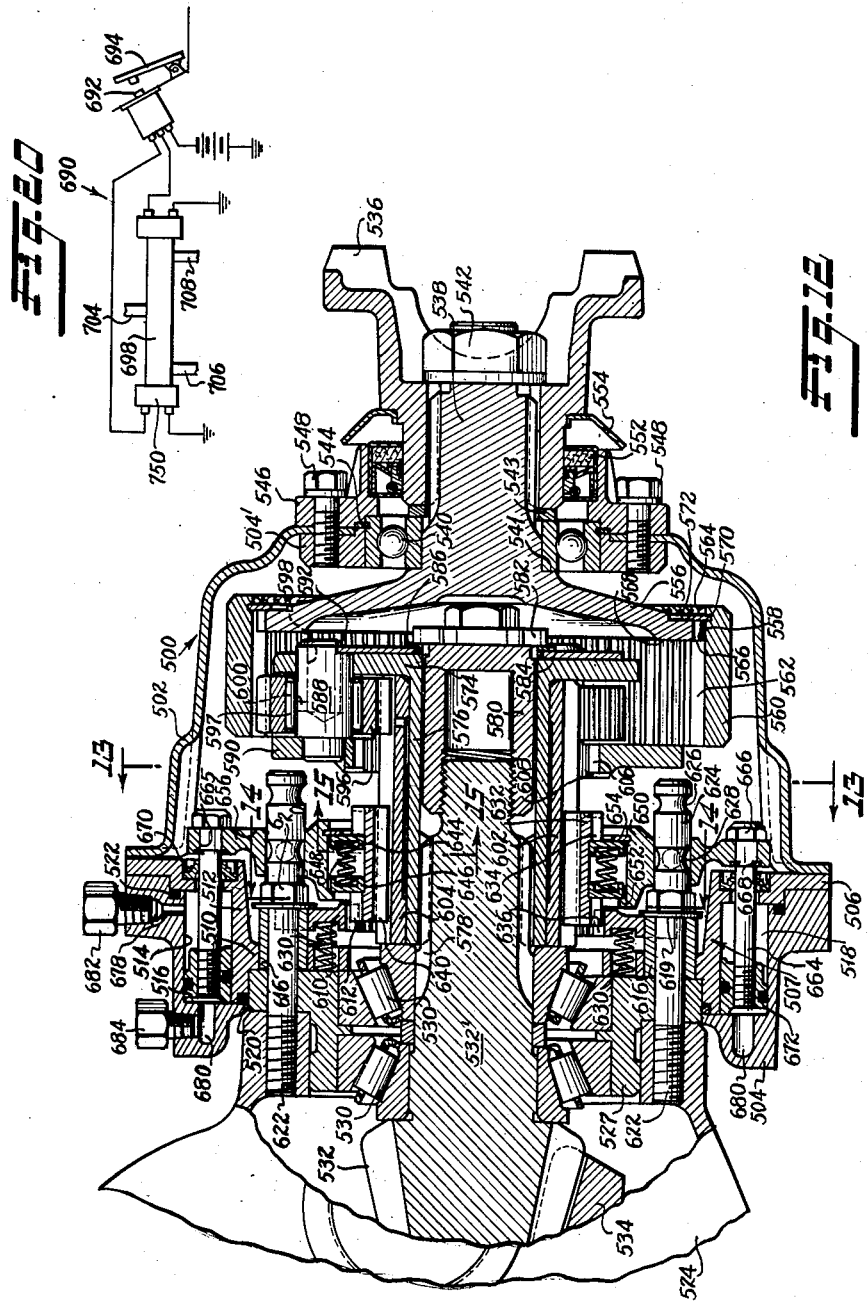

INVENTOR
CARL E. SCHOU
BY Strauch, Nolan & Diggins
ATTORNEYS

United States Patent Office 2,791,771
Patented May 7, 1957

2,791,771

FLUID OPERATED YIELDABLE SHIFTER FOR POSITIVE CLUTCHES

Carl E. Schou, Oshkosh, Wis., assignor to Rockwell Spring and Axle Company, Coraopolis, Pa., a corporation of Pennsylvania Application February 26, 1954, Serial No. 412,729

6 Claims. (Cl. 192—87)

This invention relates to vehicle drive mechanisms and more particularly is directed to improvements in multi-speed drive axles for motor vehicles.

Multi-speed drive axles of the type disclosed by United States Letters Patent 2,605,749 issued to L. R. Buckendale represent a considerable advance in improving the operating efficiency of motor vehicles by providing selectively actuated means for connecting the output of a conventional change speed transmission and drive axles in different gear ratios to increase the range of speeds available from the conventional change speed transmission without the necessity of declutching the vehicle drive train. The increased gear ratios result in greater tractive forces at low speeds and greater fuel economy at high speeds by requiring a lower engine speed to maintain a predetermined road speed at relatively low power.

The present invention embodies certain improvements in structure and operation over the Buckendale patent assuring ease and smoothness of shifting with a high degree of response by a mechanism that is relatively compact and lightweight, and is actuated by a structurally and operationally novel power shift mechanism.

It is a major object of the present invention to provide an improved selectively shiftable multi-speed drive axle for motor vehicles that is compact and lightweight, and has a high speed of response to shifting operations.

A further object of this invention is to provide a novel two speed transmission wherein resiliently mounted clutch means slidably associated with a rotatable member is selectively resiliently engaged in high and low speed gear drive positions with no intermediate neutral position.

An additional object of this invention is to provide a novel two speed planetary transmission wherein a relatively light resiliently mounted clutch collar slidably associated with the sun gear is resiliently shifted between direct and planetary gear drive (underdrive or overdrive) positions with no intermediate neutral position.

A further object of this invention is to provide a relatively light shiftable sleeve resiliently mounting clutch means wherein shifting movements of the sleeve are transmitted to the clutch means through the resilient mounting to effect selective resilient engagement of the clutch means with associated clutch members.

Still another object is to provide a selectively shiftable member resiliently mounting a light clutch collar wherein shifting movements of the shiftable member are transmitted to the clutch collar through the resilient mounting to effect resilient disengagement and engagement of the clutch collar with associated clutch members.

It is also an object of this invention to provide resiliently mounted clutch means selectively shiftable to different drive ratios with improved actuating means.

Still another object of this invention is to provide resiliently mounted clutch means selectively movable on a drive shaft to different drive ratios and having no neutral position with improved actuating means wherein the actuating means and clutch means are operatively connected by means coaxial with the drive shaft.

It is a further object of this invention to provide a pair of opposed fluid motors for selectively moving a resiliently mounted clutch member between predetermined operating positions.

Yet another object of this invention is to provide an improved fluid motor and resilient means for cooperatively moving a resiliently mounted clutch member between predetermined operating positions.

An additional object of this invention is to provide improved electrical actuating means for moving a resiliently mounted clutch member between predetermined operating positions.

Yet another object of this invention is to provide an improved multi-speed transmission housing incorporating novel actuating means for moving a resiliently mounted clutch member between predetermined operating positions.

A further object of this invention is to provide an improved multi-speed planetary transmission housing with a novel double actuating fluid motor for selectively moving a resiliently mounted clutch member between predetermined operating positions.

These and other objects will become apparent from the following description and appended claims when read in connection with the attached drawing, wherein:

Figure 1 is a horizontal plan view partially broken away of a preferred embodiment of this invention;

Figure 2 is a fragmentary horizontal sectional view of a preferred embodiment of the novel clutch and shifting mechanism of this invention;

Figure 3 is a view taken substantially along the line 3—3 of Figure 1;

Figures 4 through 7 are partial sectional views with associated diagrammatic views of the various positions of the clutch mechanism in shifting from one speed condition to another;

Figure 8 is a schematic view showing the automatic control mechanism for actuating the preferred embodiment of Figures 1 through 3;

Figure 9 is a fragmentary horizontal section of a further embodiment of a novel actuating means for the improved shift mechanism of this invention together with a diagrammatic showing of a further form of automatic control mechanism;

Figure 10 is a still further embodiment of a novel actuating means for the improved shift mechanism of this invention;

Figure 11 is a fragmentary horizontal section of yet another novel embodiment of novel actuating mechanism for the improved shift mechanism of this invention together with a diagrammatic illustration of a novel form of automatic control system associated therewith;

Figure 12 is a horizontal section of still a further embodiment of the novel shift and actuating mechanism of this invention;

Figure 13 is a section substantial along line 13—13 of Figure 12;

Figure 14 is a partial section taken substantially along the line 14—14 of Figure 12;

Figure 16 is a vertical section of the piston of the novel actuating mechanism of this invention;

Figure 20 is a diagrammatic view of an automatic control system for actuating the actuating mechanism and shift mechanism of the embodiment of Figure 12.

Figure 17:
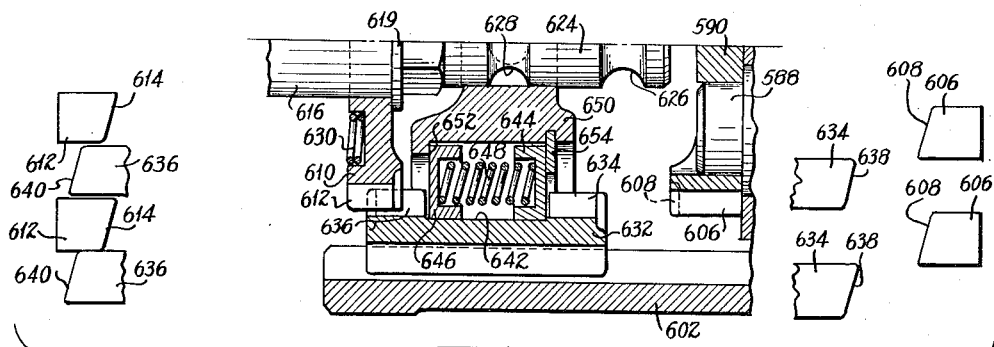
Figures 17 through 19 are partial sectional views similar to Figures 4 through 7, showing the various positions of the clutch mechanism of Figure 12 in shifting from one speed condition to another.

Turning now to the drawings, Figure 1 illustrates a multi-speed double reduction and differential drive mechanism 10 for a drive axle comprising a differential gear carrier housing 12 at the nose or forward portion of which is mounted a bearing cage 14. Cage 14 rotatably mounts bevel or hypoid input pinion 16 and integral shaft 17 on spaced antifriction bearings 18 in a conventional manner and is secured to the carrier 12 as by bolts 20. To the outer end of bevel pinion shaft 17 is splined a coupling flange 22 which provides for a driving connection to an engine driven propeller shaft (not shown) and which is retained on pinion shaft 17 by nut 26 threadedly engaging an end of pinion shaft 17.

Seal 28 is mounted in surrounding relation to coupling 22 in the end of bearing cage 14, and is protected from foreign matter by baffle 30 press fitted on flange coupling 22.

Bevel or hypoid drive gear 32, keyed at 33 (Figure 2) or otherwise drivingly connected to shaft 34 rotatably mounted in housing 12, is in constant mesh with pinion 16. High and low speed gears 36 and 38, respectively, are rotatably mounted on shaft 34 on opposite sides of a selectively shiftable clutch assembly 40, which is operative to drivingly connect gears 36 and 38 to shaft 34 alternatively. Gears 42 and 44 which mesh respectively with gears 36 and 38 are fixed coaxially to the differential casing on cage 46 by plurality of through bolts 48 passing through the gears and flanges 52 of the two halves of the casing 46 and a plurality of shorter bolts 50 passing through one of the gears and a respective flange 52. Differential case 46 is mounted on spaced opposed antifriction bearings 54 mounted in bores 56 of carrier 12 and retained in their respective bores by nuts 58 held in retaining position by lock washers 60 fixedly secured to housing 12, as by screws 62.

Spider 64, fixedly secured between the opposed halves of two piece case 46 under the clamping force of bolts 48, rotatably mounts spaced differential bevel pinions 66 which are in constant mesh with differential bevel side gears 68. Bevel side gears 68 are journalled in case 46 and splined to the inner ends of axle shafts 70 to inpart differential driving torque thereto.

In operation, pinion 16 drives bevel gear 32 and drive torque is transmitted through shaft 34 to the one of gears 36 and 38 connected thereto by shiftable clutch assembly 40. When gear 38 is connected to shaft 34, it imparts low speed rotation to cage 46 through gear 44. When gear 36 is connected to shaft 34, it imparts a relatively high speed rotation to cage 46 through gear 42.

The alternative shift movements of clutch assembly 40 are imparted by opposed actuators 72 mounted on opposite sides of carrier 12 coaxial with shaft 34.

Referring to Figure 2, shaft 34 is provided midway of its length with an enlarged integral annular shoulder or land 74 having peripheral splines 76.

Splines 76 are identical in number and shape to the rows of radial clutch teeth 78 and 80 integral with the adjacent ends of gears 36 and 38, respectively. The inner faces of gears 36 and 38 bear against the opposite radial faces 82 and 84, respectively, of shoulder 74 and are chamfered at 81 and 83, respectively, to prevent binding of the gears at the junctures of shoulder 74 with shaft 34.

Bevel gear 32 is mounted with its hub in bearing contact at its opposite ends with the adjacent faces of shoulder 87 of shaft 34 and a thrust washer 88 which is preferably formed of bronze. Shaft 34 is journalled beyond gear 32 in a bearing 90 mounted in bore 92 of carrier 12 and the inner race of which is fixed in abutting relation with washer 88 by nut 94 threaded on the end of shaft 34 and locked in position by lock washer 96. A plate 100, secured to the right hand side of carrier 12 by bolts 102, has an integral internal shoulder 104 which abuts the adjacent face of the outer race of bearing 90 to axially restrain the bearing.

The opposite end of shaft 34, the left hand end as viewed in Figure 2, is journalled in bearing 106 press fitted thereon with its inner race in abutting contact with integral shoulder 108 of shaft 34. Bearing 106 is received in bore 110 of retaining plate 112 and secured to carrier 12 by bolts 114, and is axially restrained on shaft 34 by shoulder 116 abutting its outer race.

As shown in Figure 2 the fluid motors 72 are mounted exteriorly of carrier 12 at opposite ends of shaft 34.

The fluid motor 72 at the left hand side of Figure 2 will now be described in detail, the same description being applicable to the fluid motor at the right hand side. For purposes of clarity and ease of operational description the corresponding elements of the right and left fluid motors will be designated with immediately successive numerals, even numbers being used at the left and preceding odd numbers at the right.

The beaded peripheral portion 118 of a flexible diaphragm 120 fits into a complementary annular groove in the exterior face of retaining plate 112 and is clamped therein by peripheral flange 122 of dished sheet metal cover member 124 as by bolts 114 which pass through flange 122 and retaining plate 112 and threadedly engage suitable openings in housing 12.

Diaphragm 120 is provided with an opening at its center for receiving the threaded hub of cup flange 126. A pair of diaphragm pans 128 are mounted on the threaded hub of cup flange 126 with their smooth faces in contact with opposite sides of diaphragm 120.

Opposed diaphragm pans 128 and intermediatedly disposed diaphragm 120 are clamped between flange 126 and washer 130 by nut 132 threadedly mounted on the threaded hub of flange 126. Diaphragm 120 is normally resiliently biased toward shaft 34 by a conical helical spring 134 mounted with its largest diameter end coil seated in the outer pan 128 and with its smallest diameter end coil abutting the inner wall of cover 124 in encircling relation to a flanged internally threaded fluid fitting 136 which is fixed to cover member 120 and adapted to receive a fluid conduit connected to a source of vacuum. Diaphragm 120 and cover 124 thus define a diaphragm chamber from which fluid may be evacuated to actuate the diaphragm which has its other side exposed to atmospheric pressure.

As shown in Figure 2, both cup flanges 126 and 125 are provided with axial end bores 138 and 137, respectively, extending into the threaded hubs of the flanges. These bores 138 and 137 rotatably receive, respectively, cylindrical bearing pads 140 and 139. The integral shanks 142 and 141 are press fitted into the opposite ends of the bore 145 of a cross tube 144 which freely slidably extends through an axial bore 146 of shaft 34. Milled flats 148 and 147 are provided on pads 140 and 139, respectively, to admit lubricating oil to the pads and the bottoms of their respective bores. Lubricating oil is admitted between diaphragm 120 and bearing 106 by connected openings 150 and 152 in retaining plate 112 and carrier 12, and similarly between bearing 90 and diaphragm 119 through openings 149 and 151 in plate 100 and carrier 12.

The movements of diaphragms 120 and 119 are interrelated by virtue of connecting cross tube 144. That is, for example, the creation of a vacuum within the diaphragm chamber of the left motor 72 will create a pressure differential with the right hand side of diaphragm 120 resulting in a balance between the pressure on the right hand side of spring 134 so that spring 133 will move diaphragm 119 and consequently diaphragm 120 through the connection of cross tube 144 to the left as viewed in Figure 2. Rightward movement of diaphragm 119 will be accomplished in a similar manner by the creation of a vacuum on the outboard or right hand side of diaphragm 119, as will appear from the detailed description of operation.

Turning now to Figures 2 through 7 the novel selectively shiftable clutch assembly 40 will now be described.

Cross tube 144 is provided intermediate its ends with drilled diametral opening 154 for receiving transverse shifter rod 156 with a light press fit. Rod 156 extends freely through diametral bore 158 of shaft 34 located intermediate faces 82 and 84 of shoulder 74. Bore 158 is sufficiently larger in diameter than rod 156 to permit limited displacement of rod 156 axially of shaft 34.

The opposite ends of rod 156 are received in openings 160 of key members 162 (Figure 3). The ends of rod 156 and the outer surfaces of keys 162 are formed with a radius of curvature equal to the curved inner periphery of a surrounding shifting cage or sleeve 164. Key members 162 are connected to sleeve 164 for unitary axial movement therewith by spaced snap rings 166 mounted in suitable internal grooves in sleeve 164 in abutting contact with the opposite faces of keys 162.

Axially spaced clutch rings 168 and 170 provided with smooth outer peripheries 172 and 174, and toothed or splined inner peripheries 176 and 178, respectively, are rotatably and axially displaceably received in sleeve 164 and connected for rotation with and axial displacement relative to keys 162 and rod 156 by the engagement of keyways on the outer peripheries thereof with keys 162.

Clutch ring 168 is provided with a pair of diametrically opposed radially extending grooves 169 at its inner face in alignment with similar grooves 171 in clutch ring 170 to permit transverse shifter rod 156 to extend therebetween irrespective of the relative axial positions of rings 168 and 170. The inner adjacent faces of clutch rings 168 and 170 are each provided with a like plurality of equiangularly spaced shallow bores 180 and 182, respectively, for receiving the ends of coil springs 184 which normally axially bias clutch rings 168 and 170 into engagement with adjacent snap rings 166.

The end faces of clutch teeth 78 and 80 and the faces of teeth 176 and 178 are complementarily inclined or chamfered, as indicated at 186, 188, 190 and 192 respectively, as best seen in Figures 4 through 7, in the manner of Maybach teeth more fully described in United States Letters Patents 2,049,126 and 2,049,127 to which reference is made for further detail. As is indicated at 194, 196, 198 and 200 in Figures 2 through 7, the radial depth of each of the chamfers 186, 188, 190, and 192 of teeth 78, 80, 176 and 178 is greater than that of the respective teeth to assure adequate clearance between the top of one set of teeth and the bottom of the chamfer on a complementary set of teeth to prevent binding therebetween. The Maybach type clutch teeth of this invention are relatively inexpensive to produce since the clutch teeth are actually splines formed by relatively simple machining operations and chamfered at the ends.

The novel structure herein disclosed is a compact unit having minimum outer dimensional requirements and is constructed of rugged structural components. Of particular importance is the ready, inexpensive adaptation or conversion of conventional two speed axles to the present novel shifting mechanism of this invention. Usually all that is required is the drilling of an axial bore in the two speed axle cross shaft, similar to shaft 34, for a cross tube 144, drilling of a transverse bore 158 for shifter rod 156, and provision for the mounting of a pair of fluid motors. The additional elements of this novel shifter mechanism usually require no reworking or machining to be adapted to most conventional two speed drive axles.

Figure 8 shows an automatic control mechanism 202 for the shifter mechanism of the multi-speed double reduction differential drive of the present invention. Automatic control 202 comprises an electric switch 204 located beneath and actuated by the usual pivoted carburetor connected accelerated pedal 206 of an automotive vehicle. Solenoids 208 and 210, electrically connected to the switch by electrical leads 212 and 214, respectively, are mechanically connected to opposite ends of a movable valve member of a selector valve 216 to selectively position the valve member for operation. Switch 204 is of such a type that successive actuations of the switch will actuate the two solenoids alternately to alternately establish a fluid connection through selector valve 216 to fluid conduits 218 or 220 from conduit 222 connected to the engine intake manifold. Conduits 218 and 220 are connected respectively to fittings 136 and 135 on two fluid motors 72. Depression of switch 204 will position selector valve 216 to shift the engine intake manifold connection from one to the other of the fluid motors 72.

With the foregoing structural details in mind a detailed description of the operation will follow. Referring to Figures 4 through 7, in conjunction with Figures 1, 2, and 8, there is progressively shown the shifting movement of clutch assembly 40 from low speed engagement with gear 38 to high speed engagement with gear 36.

For ease of explanation the operation of the gearing of the novel multi-speed axle in the high and low speed drive conditions and the operation of clutch assembly 40 during selective shifting movements from one speed condition to another will be first explained and later the control means for effecting actuation of the clutch to attain these drive conditions will be explained.

The novel multi-speed axle is in a low speed drive condition as illustrated in Figure 4 wherein there is a reduction in speed from the engine driven propeller shaft (not shown) to axle shafts 70. In this drive condition splines 178 of clutch ring 170 drivingly engage clutch teeth 80 of gear 38 and connect gear 38 to shaft 34 for unitary rotation therewith so that the rotation of pinion 16 is transmitted through shaft 34 to gear 38.

Conversely engagement of splines 176 of clutch ring 168 with clutch teeth 78 on gear 36 as shown in Figure 7 connects gear 36 to shaft 34.

It should be emphasized at this point that there is no neutral position of clutch assembly 40 from the drive condition of Figure 7 to the drive condition of Figure 4 which transition is effected by depressing accelerator pedal 206 which actuates switch 204 to energize solenoid 210 and position selector valve 216 so that the engine intake manifold is connected through the selector valve and conduit 218 to the outboard side of diaphragm 120 of the left hand motor 72. A vacuum is created in the diaphragm chamber for diaphragm 120 and the atmospheric pressure on the right hand side of diaphragm 120 is effective to overcome the rightward biasing force of spring 134 and to compress it. The leftward biasing force of spring 133 is effective through cross tube 144 to help move diaphragm 120 to the left.

Leftward movement of cross tube 144 is imparted to transverse shifter rod 156 to effect shifting of clutch assembly 40 toward low speed drive. Similarly sufficient depression of accelerator pedal 206 to again actuate switch 204 will actuate solenoid 208 and reposition selector valve 216 to connect conduit 220 to the intake manifold and to create a vacuum on the right hand side of diaphragm 119, and as heretofore described with the leftward movement of diaphragm 120 movement of diaphragm 119 will now be to the right as viewed in Figure 2 to effect shifting of clutch assembly 40 toward high speed drive.

With the foregoing general description of the actuation of the dual diaphragms to effect right and left shifting movements of clutch assembly 40 the description of the operation of the clutch assembly during shifting movement will now be particularly described with regard to movement of clutch assembly 40 from the low speed drive condition shown in Figure 4 to the high speed drive condition shown in Figure 7.

Accelerator pedal 206 is depressed to actuate switch 204 and energize solenoid 208 to position selector valve 216 and admit vacuum on the right hand side of diaphragm 119 whereby diaphragm 119 moves to the right in Figure 2. Once the operator has depressed accelerator 206 for a shifting movement from low speed to high speed the operator removes his foot from the accelerator which thereby reduces the driving torque supplied to shaft 34 through pinion 16 and gear 32 and relieves the driving torque engagement between clutch teeth 80 and 178 to permit shifting movement of transverse shifter rod 156 to the right in Figure 2.

As shifter rod 156 moves to the right, a force is transmitted through key members 162 to the right hand snap ring 166, through sleeve 164 and the left hand snap ring 166 to impose rightward disengaging movement on clutch ring 170 to effect its disengagement from the clutch teeth on gear 38. Rightward movement of clutch ring 170 exerts a rightwardly directed resilient biasing force upon clutch ring 168 through coil springs 184. Clutch ring 168 will be moved to the right under the biasing influence of springs 184 until the inclined ends 190 of clutch teeth 176 abut the inclined ends 186 of clutch teeth 78. So long as clutch assembly 40 is rotating faster than gear 36 interengagement of the respective clutch teeth is prevented and there will be a relative ratcheting of the clutch teeth past one another and continued rightward movement of shifter rod 156 and sleeve 164 will move right hand snap ring 166 away from clutch ring 168 to a position such as is shown in Figures 5 and 6. This continued rightward movement of shifter rod 156 moves clutch ring 170 completely out of engagement with the clutch teeth 80 of gear 38 until the inclined end faces 192 of teeth 178 are ratcheting over the inclined end faces 188 of teeth 80 and coil springs 184 are compressed, as shown in Figure 6. At this position shifter rod 156 has bottomed in groove 169 of clutch ring 168 and is prevented from further rightward movement until clutch assembly 40 and gear 36 are running at a synchronized speed and capable of meshing. In the position shown in Figure 6 with the clutch assembly intermediate gears 36 and 38, relative ratcheting of the respective clutch teeth is possible by the limited relative axial sliding movements of clutch rings 168 and 170 in sleeve 164 permitted by intermediate coil springs 184.

At this time clutch assembly 40 and shaft 34 are rotating at a slower speed than gear 38 and at a higher speed than gear 36. This differential in rotational speed occurs since gears 36 and 38 are freely rotatably mounted on shaft 34 and in their unclutched position are rotated by the drive wheels through their respective gears 44 and 42.

By virtue of this differential in rotational speed between clutch assembly 40 and gears 38 and 36 there will be no engagement of the splines of clutch rings 168 and 170 with the respective gear splines 78 and 80 and the clutch teeth will be ratcheting past one another until clutch assembly 40 slows down sufficiently to be in synchronization with the rotation of gear 36.

Synchronization of gear 36 and clutch assembly 40 is effected by deceleration of the engine under control of the operator to permit clutch assembly 40 and shaft 34 to slow down to the rotational speed of gear 36. When clutch assembly 40 and gear 36 are synchronized, clutch ring 168 under the biasing force of springs 184 will slide to the right to abut its adjacent snap ring 166 so that teeth 176 are drivingly engaged with teeth 78.

Rightward movement of clutch ring 168 into driving engagement with gear 36 results in rightward movement of groove 169 so that shifter rod 156 is free to move to the right under the influence of diaphragm spring 134 which movement imparts further rightward movement to sleeve 164 through keys 162 and snap rings 166 to position clutch assembly 40 in the position illustrated in Figure 7 with clutch ring 168 and gear 36 fully engaged and clutch ring 170 and gear 38 out of engagement, which is the high speed drive condition defined by gear train 16, 32, 36 and 42.

Shifting from the high speed drive condition illustrated in Figure 7 to the low speed drive condition illustrated in Figure 4 is substantially similar to that just described in shifting from low speed of Figure 4 to high speed of Figure 7, but in this shifting movement clutch assembly 40 must increase in speed upon disengagement with gear 36 up to the rotational speed of gear 38 before intermeshing of splines 178 and 80 is possible. This is accomplished in the following manner. Accelerator 206 is initially depressed to actuate switch 204 and solenoid 210 which positions selector valve 216 to connect conduit 218 to the engine manifold to establish a vacuum on the left hand side of diaphragm 120. Immediately after actuation of switch 204 the operator takes his foot off accelerator pedal 206 reducing the driving torque between splines 78 and 176 to permit disengagement of these splines and initial leftward shifting movement of transverse shifter rod 156 in Figure 2. One clutch assembly 40 has shifted to the condition illustrated in Figure 6 wherein the inclined spline faces of clutch rings 168 and 170 are both ratcheting past their respective splines 78 and 80 and springs 184 are under maximum compression the operator again depresses accelerator 206 sufficiently to speed up the engine, but not sufficiently to actuate switch 204, which increase in speed causes shaft 34 and clutch assembly 40 to increase in rotational speed up to the rotational speed of gear 38. When gear 38 and clutch assembly 40 are rotating at the same speed clutch ring 170 will move to the left in Figure 6 under the biasing force of springs 184 to smoothly mesh splines 178 and 80 in driving relation to thereby establish the low speed driving condition defined by gear train 16, 32, 38, 44.

By use of the inclined surface teeth of the respective clutch teeth as herein disclosed it is impossible in forward drive with the vehicle transmission shifted to a forward speed for clutch assembly 40 to have a higher rotational speed than gear 38 when moving to the low speed condition of Figure 4 since the high points or teeth 178 would abut the high point of teeth 80 thereby preventing reverse relative rotation of clutch assembly 40 and gear 38.

Similarly underspeeding of clutch assembly 40 relative to gear 36 is also prevented in forward drive by the similar arrangement of the respective clutch teeth since the high points of splines 176 would abut the high points of splines 78 should clutch assembly 40 attempt to rotate at a lesser speed than gear 36 to thereby prevent reverse relative rotation of clutch assembly 40 and gear 36. Thus positive intermeshing of the respective gears and clutch rings is always assured when moving either to the high speed drive condition of Figure 7 or the low speed drive condition of Figure 4.

It should also be noted again at this point that there is no neutral position for clutch assembly 40, the transition from low speed driving engagement between clutch ring 170 and gear 38 illustrated in Figure 4 to the high speed drive engagement of clutch ring 168 and gear 36 illustrated in Figure 7 being very rapid if operated properly. The position of clutch rings 168 and 170 illustrated in Figure 6 is merely a transition point between one drive condition and the other, and not a neutral position of the clutch assembly. As a result of this no-neutral position of the novel multi-speed drive axle of this invention it will be appreciated that there is a high speed of response in shifting from one drive condition to the other and it is possible for the operator to easily shift this mechanism to quickly adapt the vehicle to the most suitable driving conditions for the particular operation of the vehicle.

Further the novel arrangement of dual diaphragms 72 at opposite ends of cross tube 144 permits the diaphragms to be compactly mounted with a minimum of overhang from differential housing 12, since the vacuum is created in the outboard side of each diaphragm only, thereby eliminating the necessity of having protruding diaphragm casings to permit fluid connections to both sides of the diaphragm. The above novel structural arrangement is made possible by the unique interaction of springs 134 and 133 with the differential pressure relation between opposite sides of the respective diaphragm to effect rapid and efficient shifting. Thus it will readily be seen that a more compact, highly responsive, and positive operating multi-speed differential drive mechanism results from the novel shifting mechanism herein disclosed.

Additionally from the foregoing description it will be readily appreciated that springs 184 which resiliently bias apart clutch rings 168 and 170 permit both the relative ratcheting of clutch assembly 40 relative to gears 36 and 38 and also determine the force under which clutch assembly 40 is moved into selectiv clutching engagement with either gear 36 or gear 38 whereby a proper clutching force is always applied to the clutch assembly 40 to move it into engagement with its associated gear, thereby avoiding any improper forces being transmitted to the clutch assembly 40 which might cause damage to the clutch teeth of the respective members.

Figure 9 shows a modification of the novel shift and actuating mechanism for multi-speed drive axles wherein a single vacuum actuator 224 is associated with the novel clutch assembly 40. Parts in this modification have been assigned identical relative numbers.

Cross shaft 226 is provided with an axial bore extending inwardly approximately three-quarters of its length from the left hand side in Figure 9. Cross shaft 226 mounts clutch assembly 40 and low and high speed gears 36 and 38 and is journalled on carrier 12 by opposed bearings 106 and 90. Bearing 90 is retained on shaft 226 by an end plate 228 abutting the inner race of bearing 90 and secured to the end of shaft 226 by a plurality of screws 230. A suitable cover plate member (not shown) replaces right hand diaphragm assembly 72. At the left hand side of differential carrier 12, support plate 231 is mounted on carrier 12 by a plurality of bolts 232. Fixed to the support 231 by studs 234 is the fluid motor 224.

Motor 224 comprises a pair of opposed sheet metal housing halves 236 and 238 connected by bolts 240 and nuts 242 to peripherally clamp a flexible diaphragm 244. Housing half 238 is fixed to mounting member 246, as by weld 248. Member 246 is provided with an internal bore 250 having an internal groove for annular seal 252 which sealingly engages the periphery of rod 254 slidably mounted in bore 250. Rod 254 is provided with a threaded axial extension for connection to diaphragm pans 256 and 258 which have suitable opposed peripheral grooves for clamping opposite sides of beaded portion 260 of diaphragm 244. Spring retainer cup 262 is also mounted on the axial extension of rod 254 with its concave face toward the left in Figure 9 to receive the large coil of conically shaped helical spring 264. Nut 266 is received on the end of this threaded extension to retain pans 256, 258 and spring cup 262 in fixed assembled relation on shaft 254. The opposite end of conical spring 264 abuts the inner face of member 236 in encircling relation to the axially inwardly extending portion of fluid fitting 268 secured to cover member 236, as by welding.

Diaphragm pans 256 and 258 are each provided with oppositely extending peripheral flange portions 257 and 259, respectively, which abut the inner walls of cover member 236 and 238 and serve as diaphragm limit stops, as will become apparent.

Cross tube 270 is freely slidably mounted in bore 225 of shaft 226 and provided at its end adjacent rod 254 with bearing pad 272 which is fixed in the bore of cross tube 270 by pin 274. The opposite end of cross tube 270 is spaced from the end wall of bore 225 by an interposed compression spring 276. Transverse shifter rod 156 is mounted in transverse bore 278 of cross tube 270 in the same manner as that illustrated in Figure 2 and is similarly connected at its outer end to clutch assembly 40, heretofore described.

At the left side of Figure 9 is schematically illustrated a control mechanism for selectively creating a vacuum in the diaphragm chamber formed by diaphragm 244 and member 236 to impart selective shifting movement to clutch assembly 40.

Battery 280 is provided with lead 282 connected to ground and lead 284 connected to one side of selectively actuated switch 286 located in the floor board of a vehicle under selectively actuated accelerator pedal 288. Switch 286 is of the type which is operative, upon successive actuations by depressions of the pedal 288, to shift alternately between its open and closed conditions. The other side of switch 286 is connected through lead 290 to solenoid 292 which is in turn connected to ground through lead 294. Solenoid 292 is energized to shift to a low speed drive position. Starter button 296 is suitably connected to lead 290, as shown in Figure 9, so that the starter may be actuated only when switch 286 is in its closed or low speed position. Solenoid 292 is operatively connected to a selector valve 298 which is connected through a conduit 300 to fluid fitting 268 of diaphragm 224 and to conduit 302 to the engine intake manifold (not shown), and an axially extending conduit 304 open to the atmosphere.

It should be noted here that spring 264 is of sufficiently greater power than the aggregate resisting forces of springs 276 and 184 that will equal fluid pressure on the opposite sides of diaphragm 244, spring 264 normally biases clutch assembly 40 toward the right to the high speed position in engagement with high speed gear 36.

In shifting from the high speed position as illustrated in Figure 7 to the low speed condition illustrated in Figure 4 the operator depressed accelerator pedal 288 to close switch 286 and energize solenoid 292 to position selector valve 298 to operatively interconnect the engine intake manifold and the left hand side of diaphragm 244 by means of conduits 302 and 300. This position of valve 298 creates a vacuum on the left hand side of diaphragm 244 in Figure 9 resulting in a pressure differential of diaphragm 244 which, supplemented by the force of spring 276, is effective to move diaphragm 244 to the left. This permits cross tube 270, under the biasing force of spring 276, to move leftward and move clutch assembly 40 to drivingly engage the clutch assembly with low speed gear 38 and thereby establish the low speed drive condition illustrated in Figure 7.

When shifting from the low speed condition illustrated in Figure 4 to the high speed drive condition illustrated in Figure 7, accelerator pedal 288 is depressed to open the circuit to solenoid 292. Deenergization of solenoid 292 permits the valve member of selector valve 298 to be positioned under spring action so that the left hand side of diaphragm 244 is connected to atmosphere through conduit 304. With atmospheric pressure on both sides of diaphragm 244, spring 264, which is stronger than the combined forces of springs 276 and 184, will move diaphragm 244 to the right in Figure 9 to shift cross tube 270, transverse shifter rod 156 and clutch assembly 40 to the right to engage clutch assembly 40 with high speed drive gear 36, in the manner heretofore described in connection with the embodiment shown in Figures 1 through 3.

From the foregoing it will readily be seen that the novel clutch assembly and shifter mechanism of this invention can be simply, inexpensively, and easily incorporated in a multi-speed drive axle with a single diaphragm type actuator mechanism generally indicated at 224 novelly interconnected to the control system.

Referring now to Figure 10, there is shown a further embodiment of the invention wherein a positive air pressure type fluid motor 306 is mounted at the left hand side of carrier 12 in place of single diaphragm type fluid motor 224 of Figure 9. Retaining plate 231 secured to housing 12 as by bolts 232 mounts air chamber mounting member 308, as by a plurality of spaced bolts 310. Hollow air chamber cylinder 312 is secured to mounting member 308 as by bolts 314 and is guided thereon by internal shoulder 316 of mounting member 308. A resilient annular seal disposed between shoulder 316 and cylinder 312 prevents fluid leakage from cylinder 312. Cylinder 312 is provided with an axially extending internally threaded fluid fitting 318 at the outboard side of chamber 312 as shown in Figure 10. Piston 320 mounting peripheral seal 322 is slidably mounted in cylinder 312 and is provided with an integral axially extending shaft portion 324 slidably mounted in a suitable axial bore in support member 308 with an end in abutting contact with an end of bearing pad 272. Flat sided pin 326 mounted in shaft 324 of piston 320 slidably fits in axial groove 328 provided in the axial bore of support member 308 to thereby maintain piston 320 in non-rotative axially guided relation with respect to cylinder 312.

In this embodiment the same control mechanism as that indicated at the upper left hand side of Figure 9 may be used. However, line 302 which in the embodiment illustrated in Figure 9 is connected to the intake manifold of the vehicle in this instance is connected to the exhaust manifold of the vehicle so that when conduits 302 and 300 are connected to the left hand side of piston 320 in Figure 10 a positive air pressure will be exerted on the left side of piston 320 to move the piston and consequently clutch assembly 40 to the right against the forces of springs 276 and 184. Positioning of selector valve 298 to connect the left hand side of piston 314 to atmosphere through conduit 304 relieves the pressure on the left hand side of the piston so that spring 276 and clutch springs 184 will exert a leftwardly directed force to shift clutch assembly 40 from high speed engagement with gear 36 to engagement with low speed gear 38.

It will thus be seen by the embodiment illustrated in Figure 10 that a compact, inexpensive, structurally strong positive air pressure actuated piston type chamber fluid motor can be substituted for the diaphragm type fluid motor illustrated in Figure 9 to actuate the novel clutch assembly of this invention in the same manner as heretofore described with regard to Figure 9 with the exception that this embodiment is shifted to low when switch 286 is deactivated. The same result may be obtained with the embodiment of Figure 10 as that obtained with that of Figure 9 merely by switching leads 302 and 304.

Figure 11 shows a further embodiment of the invention wherein a novel electromagnetic motor actuator 330 is used in place of the heretofore described fluid motors.

Bearing cage or retaining plate 231, which is secured to carrier 12 by bolts 232 in the same manner illustrated in Figures 9 and 10, mounts flange 332 integral with an axially spaced from solenoid fixed core structure end wall 334, as by bolts 336. Flange 332 and end wall 334 are provided with axially extending bore 337 in axial alignment with cross tube 270. A seal receiving bore concentric with bore 337 is provided in the right hand end face of flange 332 adjacent retaining plate 231 for mounting fluid seal 338.

Cylindrical wall 340, which is preferably of a ferro-magnetic material and forms a part of a magnetic circuit to be more fully described, is mounted on suitable peripheral shoulders of end walls 334 and 342 and is fixed therebetween by elongate bolts 344 passing through axially aligned openings in integral lugs or ears 348 of the end walls and carrying nuts 346. Cover member 350 mounted on the periphery of axially extending hub 352 of end wall 342 is also retained in assembled relation against end wall 342 by bolts 344.

End wall 334 is provided with short axially extending shoulder 354 having a frusto conical or countersunk inner face 356 intersecting bore 337. End wall 342 is similarly provided with shoulder 353 having a frusto conical inner face 355 intersecting with bore 357 axially aligned with bore 337.

The tubular sleeve 358, preferably of non-magnetic material such as brass, is pressed on shoulders 353 and 354 and serves to mount annular U-sectioned bobbins 360 upon which solenoid coils 363 and 364, respectively, are wound. The coils 362 and 364 are maintained in spaced relation by washer 366 preferably of a suitable ferro-magnetic material.

Freely slidably mounted within brass tube 358 is a movable core or armature 368 having conical or chamfered faces 370 and 369 complementary to conical faces 356 and 355, respectively, which terminate in flat abutment faces 372 and 371, respectively. The axial length of armature 368 is less than the axial spacing between conical surfaces 356 and 355 to permit limited sliding axial movement of the armature.

The wall thickness of brass tube 358 is maintained as thin as possible consistent with structural requirements, so that the gap between the inner periphery of washer 366 and the outer periphery of armature 368 is at a minimum to keep the reluctance of the magnetic circuit at a minimum at that point.

Armature 368 is provided with an axial bore 374 to permit limited sliding movement of the armature relative to shaft 376 which is an integral axial extension of one end of enlarged diameter rod 378 slidably mounted in bore 337. Shoulder 377 is formed at the juncture of rod 378 and shaft 376. The opposite end of rod 378 is provided with short integral axially extending portion 380 which fits into the adjacent end of cross tube 270 and is fixedly secured therein as by pin 382. Rod 378, by virtue of its rigid connection with cross tube 270, rotates relative to coils 362 and 364, as is readily apparent.

The outermost or left hand end of shaft 376 is threaded to receive nut 384 which retains non-magnetic washer 386, preferably of brass, against a suitable integral shoulder of shaft 376 in concentric spaced relation to bore 357.

Enlarged hollow externally threaded cap 388 is threadedly mounted in opening 390 which is axially aligned with bore 357 and provides lengthwise space for axial movement of shaft 376 and a closure for end wall 342.

Cross tube 270 is connected through transverse shifter rod 156 to clutch assembly 40 in the same manner illustrated and heretofore described in connection with Figures 1 through 10.

The control mechanism for actuating the solenoids 362 and 364 to effect selective shifting of clutch assembly 40 is generally indicated at 392. Control mechanism 392 comprises an electric switch 394 located beneath and actuated by the usual pivoted vehicle accelerator pedal 396. Battery 398 is connected through lead 399 to ground and through lead 400 to one terminal of switch 394. Low speed and high speed control leads 402 and 404, respectively, are suitably connected to the other terminals of the switch and are also suitably connected to a pair of spaced terminals 406, only one of which is shown in Figure 11, mounted on cover 350 and connected to respective coils 362 and 364. Starter button 408 is connected to low speed lead 402 so that the vehicle starter may be actuated only when the control mechanism is calling for low speed.

Referring to Figures 4 through 7 in conjunction with Figure 11 a description of the operation of the solenoid type actuator for shifting the novel clutch assembly of this invention from the low speed drive condition of Figure 4 to the high speed drive condition of Figure 7 will now be given.

Accelerator pedal 396 is depressed to actuate switch 394 and thereby energize high speed solenoid coil 364. Energization of solenoid coil 364 produces a magnetic field, indicated by the phantom lines around coil 364, through end wall 334, cylindrical housing 340, spacer washer 366, the gap defined by brass tubular sleeve 358, armature 368 and the air gap between faces 356 and 370. This magnetic field causes armature 368 to shift to the right in the usual manner to close the gap between faces 370 and 356. Rightward movement of armature 368 causes flat face 372 to abut shoulder 377 of rod 378 and push rod 378 and consequently cross tube 270 to the right to thereby effect disengagement of clutch ring 170, as heretofore described in connection with Figures 1 through 7. Further rightward movement of cross tube 270 is prevented by the bottoming of transverse shifter rod 156 in slot 169 of clutch ring 168. When clutch ring 168 and gear 36 are rotating at the same or synchronized speeds clutch ring 168 will, under the influence of springs 184, slide into engagement with gear 36 which will permit further rightward movement of clutch assembly 40, as heretofore described, which movement will move cross tube 270 and consequently rod 378 and its associated integral shaft 376 to the right as viewed in Figure 11. Rightward movement of shaft 378 will cause brass washer 386 to abut face 371 of armature 368, thereby positioning shaft 378 for shifting movement in the opposite direction when a shifting sequence from high speed to low speed is desired.

It will be readily seen that in shifting from high speed to low speed accelerator pedal 396 is depressed to actuate switch 394 and actuate low speed solenoid coil 362 through lead 404 and create a magnetic field around solenoid coil 362 which causes armature 368 to move to the left in Figure 11 and exert force on washer 386 and consequently cross tube 270 to effect reverse movement, or movement from high to low speed of clutch assembly 40, to engage gear 38 in the manner heretofore described. Upon engagement of clutch ring 170 and gear 38 transverse rod 156 will be permitted to move slightly further to the left to permit abutting engagement of end face 372 and shoulder 377 for a subsequent reverse shifting operation as heretofore described in connection with a shifting movement to high speed.

It will readily be seen from the foregoing that there is herein provided a novel positive electrical actuating means for effecting shifting movements of the novel clutch assembly of this invention. The novel electrical actuating mechanism of this invention is easily adaptable to a conventional multi-speed drive axle along with the novel clutch assembly of this invention and is easily interchangeably mounted with the diaphragm actuator of Figure 9 or the air chamber actuator of Figure 10 heretofore described. In this embodiment, as in the preceding embodiments the motor effects disengagement of the engaged clutch ring and compresses the springs 184 between the clutch rings. Clutch engaging force is exerted promptly by the compressed springs 184.

Turning now to Figures 12 through 19, there is shown a further form of this invention embodied in a carrier mounted two speed planetary double reduction final drive for a drive axle. The two speeds of this double reduction final drive are achieved by selectively rendering operative or locking out a planetary gear mechanism interposed between the input shaft and differential drive pinion shaft.

The housing structure for the two speed planetary double reduction gear mechanism 500 comprises a pair of housing members 502 and 504 rigidly connected together on opposite sides of an intermediate radially outwardly extending flange portion 506 of an internal member 507 as by a plurality of circumferentially disposed bolts (not shown). Member 507 is provided toward its opposite end with a radially inwardly directed flange 510 joined to flange portion 506 by an axially extending generally cylindrical portion 512. Cylindrical portion 512 is concentric with and inwardly spaced from the cylindrical wall 514 of housing member 504 and in abutting relation at the left hand end in Figure 12 with end wall 516 of housing 504 to define an annular fluid piston chamber 518. Chamber 518 is toroidal in form to slidably receive an annular piston therein to form a fluid motor for effecting shift between the low and high speed gear settings of the double reduction gear mechanism of this embodiment of the invention. Suitable resilient annular seals 520 and 522 disposed between the end of portion 512 and end wall 516 and between flange 506 and the adjacent end wall of housing 504, respectively, prevent fluid leakage from chamber 518.

The double reduction gear mechanism subassembly 500 is secured to the nose of differential carrier 524 by circumferentially disposed bolts 526 passing through aligned bores in flange 510 and a flange of a bearing cage 527 to engage threaded openings in the nose of differential carrier 524.

Bearing cage 527 mounts spaced opposed tapered roller bearings 530 which in turn rotatably mount the integral shaft of a bevel or hypoid pinion 532 which is in constant mesh with bevel or hypoid drive gear 534 of a conventional differential drive mechanism (not shown).

This double reduction mechanism is driven by an engine driven propeller shaft universally connected to flange coupling 536 splined upon input shaft 538. Shaft 538 is journalled by a ball bearing 540 the inner race of which is axially fixed upon shaft 538 against a shoulder 541 by nut 542 threaded on the reduced end section of shaft 538, flange coupling 536 and a spacer 543. Bearing 540 mounted upon housing member 502 is axially restrained by a snap ring 544 mounted in the outer race of bearing 540 intermediate the adjacent faces of housing member 504 and a seal retainer 546 secured to housing 502 by bolts 548. Seal 552 is mounted in bearing retainer 546 in surrounding coacting engagement with the axially extending hub of coupling 536. Baffle 554, suitably mounted on coupling 536, as by a press fit with its concave surface adjacent the exposed end of seal 552, protects the seal from foreign matter.

Within the concavity of housing member 502, shaft 538 is formed with a large radially extending flange 556 of generally concavo-convex form and to the periphery of which is splined at 558 an internal ring gear 560. Teeth 562 of ring gear 560 are cut away as at 564 to interfit with splines 558 and provide a flat radial shoulder 566 abutting flat surface 568 of flange 556. The ring gear is fixed in axial position on flange 556 and with its shoulders 566 abutting surfaces 568 by an internal snap ring 570 mounted in ring gear 560 and abutting axially facing surface 572 of flange 556.

A planetary pinion carrier 574 is provided with hub 576 splined at 578 to pinion shaft 532'. An internally threaded insert 580 threadedly connected to the reduced threaded end section of pinion shaft 532' and provided with integral radially extending shoulder 582, engages a planetary pinion shaft locking plate 584 to force the hub of carrier 574 and the inner race of bearings 530 in rigid axial assembly between pinion 532 and shoulder 582. A suitable lock washer 586 interposed between plate 584 and shoulder 582 locks insert 580 in its assembled position.

The flange portion of planetary pinion carrier 574 is provided with a plurality of equiangularly disposed openings. A like plurality of planetary pinion shafts 588 are each press fittedly received at one end in one of these openings in carrier 574 and at the other end in similar axially aligned openings of a clutch ring 590 mounted in axially spaced relation to the flange of carrier 574. The right hand end of spindles 588 extend beyond carrier 574 and are provided with milled flats 592 which are engaged by the adjacent end of lock plate 584 to axially restrain and hold spindles 588 in non-rotative relation in carrier 574. The axes of spindles 588 are in spaced parallel relation to the common axis of the integral shaft of pinion 532 and of shaft 538. A planetary pinion 596 is rotatably mounted by needle bearings 597 upon each shaft 588 intermedaite the flange portion of carrier 574 and the ring 590. These pinions 596 are in constant mesh with ring gear 560. Each spindle is provided with an axially extending bore 598 connected to transverse bore 600 which opens on the periphery of each spindle so that lubricating oil in housing 502 may reach needle bearings 597.

A sun gear 602, which is coextensive in length with and rotatably mounted on carrier hub 576 is in constant mesh with planetary gears 596. Gear 602 is journalled on hub 576 by means of integral spaced bearing pads 604, with one end of the sun gear in abutting relation with the inner race of adjacent bearing 530 and the other end abutting an adjacent face of carrier 574.

The internal periphery of clutch ring 590 is provided with an annular row of internal spline teeth 606 having inclined end faces 608 in the manner of Maybach teeth, heretofore described. A brake ring 610, which is mounted in axially spaced relation to clutch ring 590 and similarly provided with internal spline type teeth 612 having inclined end faces 614, is supported for non-rotative axial sliding movement by equiangularly spaced sleeves 616 engaging peripheral slots 618 thereon as shown in Figures 12 and 14. Sleeves 616 are mounted against the adjacent face of the radially extending flange of bearing cage 527 and bolts 622 threadedly secured in suitable apertures in the nose of differential carrier 524.

Bolts 622 are provided with integral extension portions 624, a diametrically opposed pair of which are provided with axially spaced peripheral detent receiving grooves 626 and 628 of semicircular cross section for a purpose to be described.

Brake ring 610 is biased into abutting contact with an adjacent face of the washers 619 on bolts 622 by a plurality of compressed coil springs 630 the ends of which are retained in axially aligned circumferentially disposed bores in the opposed faces of ring 610 and flange 510. Brake ring 610 is cut away at 611 as shown in Figure 14 to provide the necessary clearance relative to the heads of bolts 526.

A collar 632, which is splined for axial sliding movement along the teeth of sun gear 602, is provided at its opposite ends with external annular rows of teeth 634 and 636 having inclined end faces 638 and 640, respectively, and complementary to the external teeth upon rings 610 and 590 respectively. Two pairs of semi-circular members, each pair cooperating to form one of two substantially continuous thrust rings 644 and 646, are mounted in the peripheral groove in collar 632 formed between tooth rows 634 and 636. The segments forming ring 644 are biased away from those forming ring 646 into abutting contact with adjacent ends of teeth 634 and 636 by a plurality of equiangularly disposed coil compression springs 648 interposed between rings 644 and 646 and retained at their ends in aligned bores in the adjacent faces of rings 644 and 646.

Annular rings 644 and 646 are axially confined in an annular channel defined internally of a surrounding shift collar 650 by an integral shoulder 652 and an internally mounted snap ring 654.

Shift collar 650 (see Figure 13) is mounted for displacement axially of the assembly upon the extensions 624 of bolts 622 by the four integral radially outwardly extending arms 656 which are apertured to slidably receive extensions 624 intermediate their ends.

As shown in Figure 13 a diametrically opposed pair of the arms 656 are provided with integral laterally extending hollow bosses 658 which mount detent pins 660 biased by spring 662 into alternate engagement with grooves 626 and 628 of bolt extensions 624 to maintain collar 632 in its selected axial position.

Axial displacement of the shift collar 650 is controlled by selective actuation of the fluid motors for which toroidal chamber 518 forms the pressure chamber. Shaft collar 650 is connected to the movable member of this fluid motor at equiangularly spaced points by piston rods 664 which are connected to each of the arms 656 of collar 650, each being axially restrained in an opening 665 of an arm 656 between its integral bolt head 666 and a snap ring 668 disposed in abutting relation with opposite faces of arm 656. Slidable piston rods 664 extend through aligned openings in flange 506 of member 507 into chamber 518, fluid leakage therealong being prevented by seal 670 mounted in a suitable counterbore in flange 506 and sealingly engaging the periphery of rod 664. The inner end of each piston rod 664 is threadedly mounted in a suitable opening of piston 672 which is axially slidable in the piston chamber 518. As best illustrated in Figure 16, piston 672 is annular and is provided on both its inner and outer peripheries with seal grooves 674 and 676, respectively for receiving suitable resilient annular seals as is shown in Figure 12 to prevent fluid leakage past the piston 672 in piston chamber 518. The selective admission of fluid under pressure into chmber 518 at either side of piston 672 for effecting axial displacement of the piston 672 is effected through a pair of fluid ports 678, 680 which threadably mount fluid fittings 682 and 684, respectively, for connection to suitable fluid lines.

Piston 672 is provided with an outer peripheral portion 686 of reduced diameter so that when piston 672 is moved to the right in Figure 12, it will not block off port 678 and prevent admission of fluid to chamber 518. Also in order that fluid pressure entering chamber 518 through openings 678 or 680 may operate on a relatively large effective area of piston 672, the piston is provided at its opposite ends with axially extending integral boss portions 688 which space piston 672 from the end walls of chamber 518 the length of bosses 688 when the piston is in its extreme positions to the left or right in Figure 12. Fluid entering either opening 678 or 680 is thus allowed to react against a relatively large piston area to overcome any residual pressure on the opposite side of piston 672 and effect movement of the piston in the desired direction.

Referring now to Figure 20, numeral 690 generally indicates an automatic control system for actuating the two speed planetary shift mechanism illustrated in Figure 12, and is similar in construction to the automatic control system illustrated in Figure 8. However, the control system of Figure 20 is connected to the engine exhaust manifold through conduit 704, rather than to the intake manifold, for applying positive pressure through conduits 706 and 708 to either the left hand side or right hand side of movable piston 672, all of the operations of control system 690 being generally the same as that illustrated in Figure 8.

The operation of the foregoing described clutch mechanism in shifting from between the condition of planetary drive between input shaft 538 and pinion 532 as illustrated in Figure 12 and the condition of lock out of the planetary gear mechanism to effect direct drive between shaft 538 and pinion 532 will now be described.

Figure 12 illustrates the configuration of the drive mechanism when in its low speed drive condition. With collar 632 shifted to the left as shown in Figure 12, teeth 636 of collar 632 are engaged with teeth 612 of stationary brake ring 610. In this condition, sun gear 602 is held stationary. Therefore rotation of input shaft 538 and ring gear 560 will cause pinions 596 to planetate about the axis of sun gear 602. The planetary movement of pinions 596 about sun gear 602 produces rotation of carrier 574 and, through spline connection 578, of pinion 532.

When collar 632 is shifted to the right so that teeth 634 engage clutch teeth 606, a direct drive condition is established. In this position, collar 632 rigidly connects pinions 596 and carrier 574 to sun gear 602 and thereby couples ring gear 560 and input shaft 538 directly to pinion 532 for unitary rotation about the common axis of shaft 538 and pinion 532. This results in a direct or high speed drive connection between shaft 538 and pinion shaft 532'.

Figure 18:
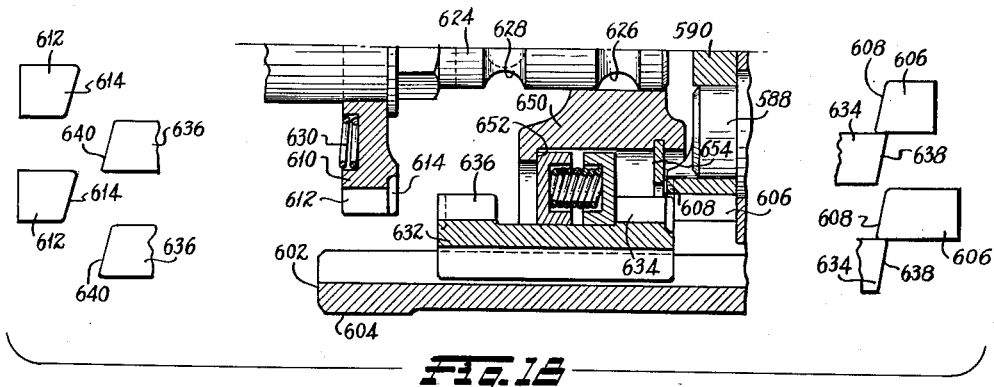
Figure 19:
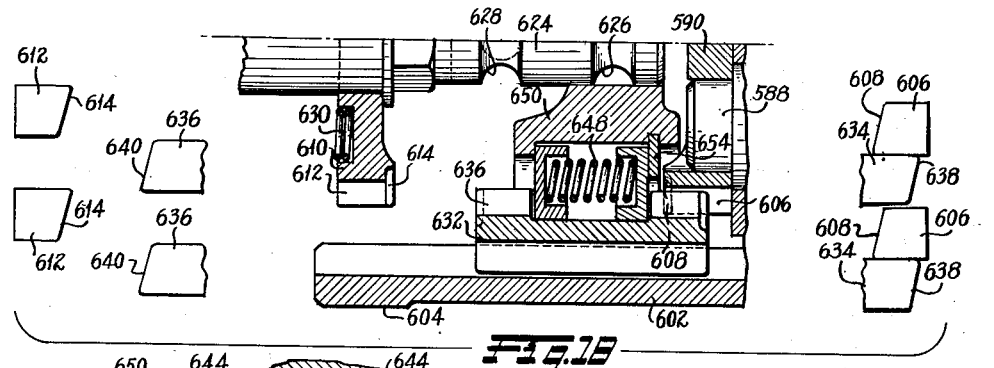
Figure 15:
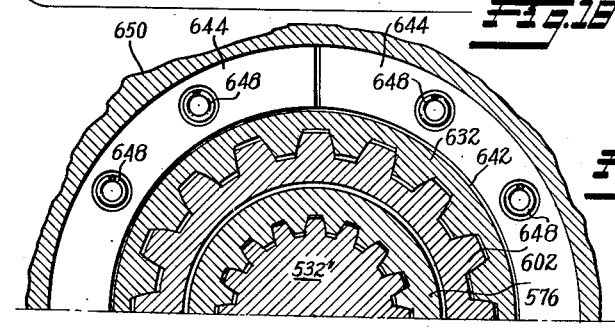
Figure 15 is a section taken substantially along the line 15—15 of Figure 12.

To effect shifting movement from the planetary gear drive or low speed drive illustrated in Figures 12 and 17 to the direct or high speed drive condition illustrated in Figure 19, accelerator pedal 694 is depressed to actuate the switch 692 to energize solenoid 750 and position selector valve 698 so that the engine exhaust manifold is connected through the selector valve 698 and conduit 706 to the left side of piston 672. A positive pressure is thereby applied to the left hand side of slidable toroidal piston 672. This pressure causes piston 672, rods 664 and shift collar 650 to move to the right Figure 12 as soon as the operator lets up on accelerator pedal 694 after having actuated switch 692 to reduce the driving torque engagement of teeth 636 and 612. Rightward movement of shift collar 650 causes shoulder 652 to abut and move ring 646 to the right thereby compressing coil springs 648. Ring 646, during rightward movement in Figure 12, moves away from the adjacent end of teeth 636 until sufficient spring force is accumulated in spring 648 to overcome any frictional engagement between teeth 636 and 612. Upon the accumulation of sufficient force in springs 648 collar 632 is forced to the right by annular ring 644 which abuts the adjacent end of clutch teeth 634 to move collar 632 out of engagement with brake ring 610. Shift collar 650 continues to move rightwardly until detent pins 660 engage groove 626. At this position illustrated in Figure 18 so long as collar 632 is rotating at a slower speed than clutch ring 590 it will not engage clutch ring 590. Until the speeds between these members are synchronized there is a ratcheting of teeth 634 relative to teeth 606. With the operator's foot off the accelerator the speed of rotation of clutch ring 590 will decrease and synchronization with collar 632 will be effected. Upon synchronization collar 632 under the influence of springs 648 will be forced to the right by annular ring 644 engaging the ends of spline 634 into engagement with teeth 606. The release of the spring force to engage collar 632 and clutch ring 590 causes splines 636 to again abut annular ring 646 as in Figure 19.

During the intermediate non-engaged condition illustrated by Figure 18, springs 648 will permit limited axial movement of collar 632 to permit a ratcheting effect between teeth 606 and 634 similar to that described in connection with Figures 4 to 7. Once collar 632 has engaged clutch ring 590, the operator may again accelerate the engine and driving torque will maintain collar 632 and clutch ring 590 in driving engagement.

To shift to planetary drive, or to the left in Figures 12 and 17, accelerator pedal 694 is again depressed to actuate switch 692 to reverse the conditions of energization of the solenoids at the opposite ends of valve 698. This shifts valve 698 to connect the engine exhaust manifold through conduit 704 anl conduit 708 to fluid fitting 682 to apply pressure to the righthand face of toroidal piston 672. Once switch 692 has been actuated the operator lets up on accelerator 694. This reduces the driving torque between teeth 634 and 606 and leftward movement of collar 632 is accomplished through the sliding movement of shift collar 650 in the same manner heretofore described to position collar 632 in ratcheting relative moving relation to brake ring 610. Once collar 632 has passed to this transition state and is ratcheting relative to brake ring 610 the operator again depresses the accelerator to speed up the rotation of carrier 574. This causes the planetary gears to rotate on their own axes thereby effecting a reduction of the rotational speed of sun gear 602 until collar 632 finally comes to a stop relative to brake ring 610. When collar 632 is stationary, it is biased under the influence of springs 648 into clutching engagement with brake ring 610 to establish planetary or low speed drive as illustrated in Figure 12. Once again upon driving engagement of teeth 636 and 612 the operator may accelerate the vehicle engine.

It readily will be seen from the foregoing that collar 632 which is resiliently connected through intermediate springs 648 to shifter collar 650 is resiliently disengaged and engaged with the respective rings 610 and 590. The resilient mounting of collar 632 assures application of proper disengaging forces and proper engaging forces to collar 632 and thereby prevents the application of restrictively high forces and possible damage to the teeth. Additionally the resilient mounting of collar 632 permits limited axial displacement of the collar during relative ratcheting of the collar relative to rings 610 and 590 in the preengaging positions of the collar with these rings.

It should be again emphasized at this point that the intermediate stage illustrated by Figure 18 is merely a transition position between engagement of the collar 632 with one of the clutch rings or the other and is not a neutral position, and as a result of this transition of collar 632 a high degree of response to shifting signals is possible with the novel two-speed planetary transmission herein disclosed.

From the foregoing it will be seen that there is herein disclosed simple novel shift and actuating mechanisms for multi-speed drive axles which by reason of compactness, rigidity and strength may be placed in any type of drive of the conventionally known vehicles.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed and desired to be secured by United States Letters Patent is:

1. In a vehicle, a housing, relatively rotatable axially spaced driven clutch members in said housing; a rotatable clutch assembly mounted in said housing coaxial with and between said driven clutch members for selective displacement into alternative driving engagement with said driven clutch members; a pair of spaced opposed fluid motors; movable connecting means operatively connecting said fluid motors; biasing means in said fluid motors exerting opposite forces on said connecting means; means for selectively balancing the force of one of said biasing means in alternative fluid motors to permit the other biasing means to impart predetermined selective movement to said connecting means; and means operatively connecting said connecting means and clutch means whereby selective movements of said connecting means are imparted to said clutch means to effect selective displacement of said clutch means.

2. In combination, a shaft having an intermediate portion, gears rotatably mounted on said shaft on opposite sides of said portion and having opposed annular rows of clutch teeth, a clutch assembly surrounding said shaft between said gears and comprising a collar having axially spaced end stops and two clutch rings resiliently biased apart toward said stops non-rotatably connected to said shaft portion, said clutch rings providing rows of teeth adjacent said teeth on the gears, a shift motor mounted near one end of said shaft, a shift rod driven by said motor and extending into the interior of said shaft and a radially extending member operatively connecting said shift rod and said collar, said shift rod extending all the way through said shaft, and a second shift motor connected to the other end of said rod.

3. In a vehicle drive train, a shaft having an externally splined portion, a gear journalled upon said shaft at each side of said splined portion, said gears being each provided at their adjacent ends with an annular row of axially extending clutch teeth terminating in inclined ratcheting end faces, a pair of toothed clutch rings slidably splined on said shaft portion in back to back relation, means resiliently biasing said rings apart axially, a collar surrounding said rings and providing axially spaced abutments defining the limits of separation of said rings, and means for shifting said collar to selectively operatively mesh the teeth of one clutch ring with one of said gears or the teeth of the other of said clutch rings with the other of said gears.

4. The combination defined in claim 3 wherein said shaft has a longitudinally extending coaxial bore extending from as least one end thereof to said splined portion and a radial bore intersecting said longitudinal bore and opening through said splined portion and wherein said shifting means comprises a shift motor near said shaft one end, a shift rod driven by said motor and extending into said longitudinal bore and a radially extending member extending through said radial bore and connected to said collar and to said rod.

5. The drive train defined in claim 3 wherein said biasing means extends between and is seated at opposite ends on said clutch rings.

6. The drive train defined in claim 3 wherein said biasing means comprises a plurality of coil springs.

References Cited in the file of this patent

UNITED STATES PATENTS

| Re. 17,707 | Maybach | June 24, 1930 |
| 1,345,633 | Pyle | July 6, 1920 |
| 2,603,327 | King | July 15, 1952 |
| 2,605,749 | Buckendale | Aug. 5, 1952 |
| 2,641,637 | D'Ozouville | June 9, 1953 |
| 2,684,739 | Hasbrouck | July 27, 1954 |
| 2,718,950 | Lapsley | Sept. 27, 1955 |
| 2,723,735 | Banker | Nov. 15, 1955 |

FOREIGN PATENTS

| 69,626 | Denmark | July 11, 1949 |
| 826,574 | France | Jan. 8, 1938 |